(12) United States Patent
Hasler

(10) Patent No.: US 11,585,439 B2
(45) Date of Patent: Feb. 21, 2023

(54) EDGE-WELDED BELLOWS

(71) Applicant: VAT Holding AG, Haag (CH)

(72) Inventor: Christian Hasler, Widnau (CH)

(73) Assignee: VAT Holding AG, Haag (CH)

( * ) Notice: Subject to any disclaimer, the term of this patent is extended or adjusted under 35 U.S.C. 154(b) by 0 days.

(21) Appl. No.: 17/442,191

(22) PCT Filed: Feb. 4, 2020

(86) PCT No.: PCT/EP2020/052729
§ 371 (c)(1),
(2) Date: Sep. 23, 2021

(87) PCT Pub. No.: WO2020/192987
PCT Pub. Date: Oct. 1, 2020

(65) Prior Publication Data
US 2022/0186832 A1 Jun. 16, 2022

(30) Foreign Application Priority Data
Mar. 25, 2019 (DE) .......................... 102019107630.7

(51) Int. Cl.
*F16J 3/04* (2006.01)
*F15B 1/10* (2006.01)

(52) U.S. Cl.
CPC .............. *F16J 3/047* (2013.01); *F15B 1/103* (2013.01); *F15B 2201/3153* (2013.01)

(58) Field of Classification Search
CPC ... F15B 1/103; F15B 2201/3153; F16J 3/047; F16J 3/048
See application file for complete search history.

(56) References Cited

U.S. PATENT DOCUMENTS

| | | | |
|---|---|---|---|
| 2,657,075 | A | 10/1953 | Schwester et al. |
| 4,183,289 | A | 1/1980 | Jinnouchi |
| 4,650,160 | A | 3/1987 | Smith |
| 5,983,738 | A | 11/1999 | Delaisse |
| 2002/0175480 | A1 | 11/2002 | Tatzreiter |

(Continued)

FOREIGN PATENT DOCUMENTS

| | | |
|---|---|---|
| CN | 203363518 | 12/2013 |
| EP | 2177792 | 4/2010 |

(Continued)

*Primary Examiner* — Kenneth Bomberg
*Assistant Examiner* — Matthew Wiblin
(74) *Attorney, Agent, or Firm* — Volpe Koenig

(57) ABSTRACT

An edge-welded bellows, including a plurality of diaphragms and a guide part for guiding on the outer surface of a rod extending through an inner through-opening of the bellows or for guiding on the inner surface of a tube surrounding the bellows. The guide part has a retaining fin, which, at the edge thereof, lies between the edges of adjacent diaphragms and is welded thereto, and a guide sleeve, which surrounds the longitudinal central axis and has a guide surface for guiding the bellows on the outer surface of the rod or the inner surface of the tube. The guide sleeve has a wall thickness that is more than three times that of the retaining fin. The guide sleeve has a step having a contact surface. The retaining fin lies, in a region adjoining the edge thereof, on the contact surface and is form-fittingly secured against being lifted off from the contact surface.

18 Claims, 8 Drawing Sheets

(56) References Cited

U.S. PATENT DOCUMENTS

2009/0188897 A1\* 7/2009 Margairaz .............. F16J 3/047
  219/75
2016/0033061 A1\* 2/2016 Tatzreiter .............. F16J 3/047
  138/121

FOREIGN PATENT DOCUMENTS

| EP | 2982888 | 2/2016 | | |
| EP | 3184863 | 10/2018 | | |
| FR | 2703749 | 10/1994 | | |
| GB | 2062132 | 10/1979 | | |
| GB | 2374902 A | \* 10/2002 | .............. | F15B 1/22 |
| JP | 2013221596 | 10/2013 | | |
| KR | 100906072 | 7/2009 | | |
| KR | 100954483 | 4/2010 | | |

\* cited by examiner

Fig. 14
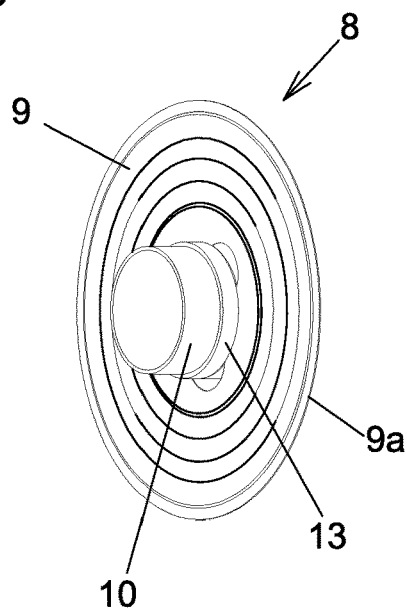
Fig. 15
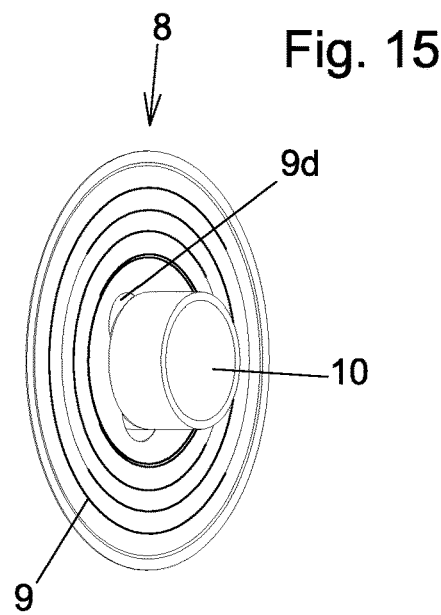
Fig. 17
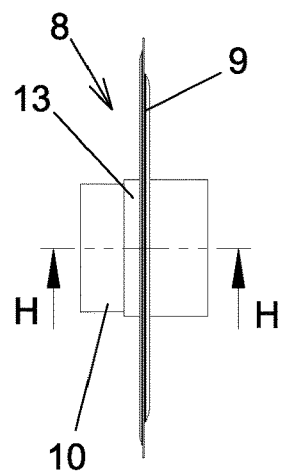
Fig. 16
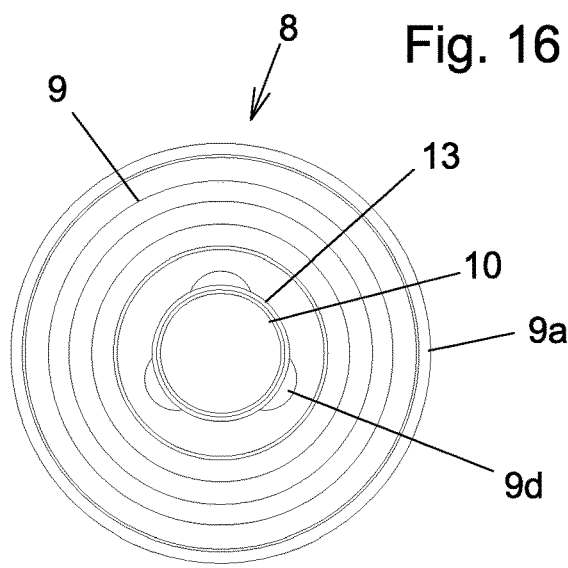
Fig. 18
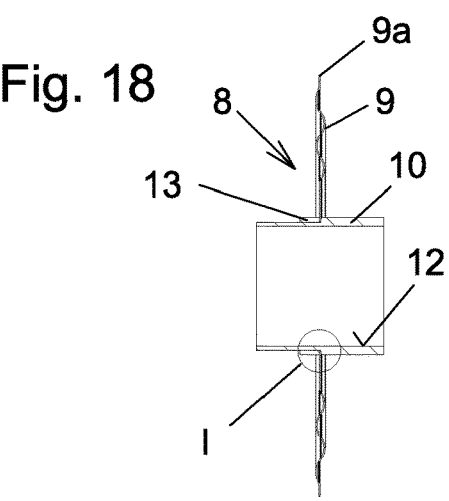
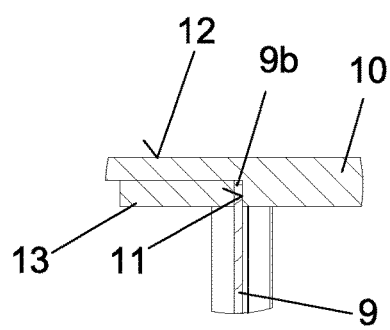
Fig. 19

EDGE-WELDED BELLOWS

TECHNICAL FIELD

The invention relates to a diaphragm bellows having a plurality of diaphragms with outer edges and inner edges, wherein diaphragms that follow one another in the direction of the longitudinal central axis of the diaphragm bellows are welded to one another alternately in the region of their inner edges and in the region of their outer edges, wherein the diaphragm bellows furthermore has at least one guide part for guidance on the outer surface of a rod which passes through an inner through-opening in the diaphragm bellows and has a retaining fin, which is located, in the region of its outer edge, between adjacent diaphragms of the diaphragm bellows, is welded to said adjacent diaphragms and an inner edge of which that surrounds a central opening in the retaining fin is located closer to the longitudinal central axis of the diaphragm bellows than the inner edges of said adjacent diaphragms, and has a guide sleeve, surrounding the longitudinal central axis, with a guide surface for guidance of the diaphragm bellows on the outer surface of the rod, wherein the guide sleeve passes through the central opening in the retaining fin and is connected to the retaining fin.

The invention moreover relates to a diaphragm bellows having a plurality of diaphragms with outer edges and inner edges, wherein diaphragms that follow one another in the direction of the longitudinal central axis of the diaphragm bellows are welded to one another alternately in the region of their inner edges and in the region of their outer edges, wherein the diaphragm bellows furthermore has at least one guide part for guidance on the on the inner surface of a tube which surrounds the diaphragm bellows and has a retaining fin, which is located, in the region of its inner edge, between adjacent diaphragms of the diaphragm bellows, is welded to said adjacent diaphragms and an outer edge of which is located further away from the longitudinal central axis of the diaphragm bellows than the outer edges of said adjacent diaphragms, and has a guide sleeve, surrounding the longitudinal central axis, with a guide surface for guidance of the diaphragm bellows on the inner surface of the tube, wherein the guide sleeve surrounds the outer edge of the retaining fin and is connected to the retaining fin.

BACKGROUND

Diaphragm bellows are generally used as a flexible sealing element in order to separate regions of pressure which differ in an application. Diaphragm bellows are thus used for example for vacuum leadthroughs of vacuum valves, wherein the diaphragm bellows encloses the drive rod of the valve and separates the vacuum region from the atmosphere region when the valve is being opened and closed. In addition to applications for vacuum leadthroughs for introducing movement into the vacuum, diaphragm bellows can be used for example as compensators for absorbing thermal expansions or assembly tolerances. A further application consists for example in vibration decoupling in a vacuum system, e.g. between a vacuum pump and a measuring instrument.

Diaphragm bellows consist of diaphragms that are welded to one another alternately at their outer and inner edges. During production, first of all diaphragm pairs are welded to one another at their inner edges and subsequently the diaphragm pairs are arranged in line with one another and welded to one another at their outer edges. With such diaphragm bellows, travel in an axial and/or lateral and/or angular direction is possible.

In addition to diaphragm bellows, corrugated bellows are known, in which tubes are deformed in the manner of a bellows, as a result of which movability is achieved. Specific configurations of corrugated bellows can be found for example in U.S. Pat. No. 4,650,160 A and GB 2 062 132 A.

When diaphragm bellows are used, pressure differences usually arise between the interior space and the outer side of the diaphragm bellows, wherein the pressure inside the diaphragm bellows can be lower or higher than the pressure which is present outside the diaphragm bellows. Due to such pressure differences (in particular when a higher pressure prevails inside the diaphragm bellows than outside the diaphragm bellows) and/or as a result of the gravitational force, it is possible, due to the low side rigidity of the diaphragm bellows, for lateral buckling of the diaphragm bellows to occur to a greater or lesser extent when the diaphragm bellows is sufficiently long. For example, as a result, the diaphragm bellows can come to bear against a rod (e.g. drive rod of a vacuum valve) extending through the inner through-opening in the diaphragm bellows, in regions of the welds of the inner edges of the diaphragms. In the event of the rod displacing, the inner edges of the diaphragms thus rub against the rod, and this results in wear to the weld seams between the inner edges of the diaphragms, with the result that over time the strength of these weld seams can be impaired and leaks can occur.

Therefore, guide parts for guiding the diaphragm bellows in the central regions of its longitudinal extent have already been used. US 2002/0175480 A1 discloses annular guide parts (=slide rings) with outwardly protruding protuberances which project into the space between adjacent diaphragms of the diaphragm bellows and secure the guide part in a form-fitting manner against displacement in an axial direction of the diaphragm bellows. The inner edges of the two diaphragms, between which a respective slide ring is retained, rest against the outer lateral surface of the slide ring. In the compressed state of the diaphragm bellows, the inner edges of adjacent diaphragms are also arranged over the outer lateral surface of the slide ring. A certain disadvantage of such slide rings is that the possible axial travel of the diaphragm bellows is reduced. In addition, such slide rings have a relatively large mass in comparison with the diaphragms, which leads to the diaphragms being subject to additional dynamic loads. In the state installed in the vertical direction, the mass of the slide rings also results in a different expansion of the diaphragm bellows below and above each slide ring, and this is enhanced and likewise leads to higher loads on the diaphragm bellows in the event of a plurality of slide rings being used.

In the case of the diaphragm bellows known from CN 203 363 518 U, a solid support ring is welded in between two portions of the diaphragm bellows. Similar problems to those described above occur here.

JP 2013221596 A discloses a bellows having guide members formed in the manner of scissors. This is a complex structure.

U.S. Pat. No. 4,183,289 discloses a bellows having a device for restricting the extension of the bellows. Provided in this respect are annular platelets, the outer edges of which are located between adjacent diaphragms of the bellows and which are connected in the region of their radially inner edges to sleeve-like elements, at the ends of which stop extensions are arranged.

The use of diaphragm bellows in implantable infusion pumps for dispensing a medicament is also known. The medicament is situated inside the diaphragm bellows, which is closed at the bottom side by a base and at the top side by a base plate of the infusion pump. A pressure which acts on the base compresses the diaphragm bellows and meters the medicament. In order to determine the remaining volume of the diaphragm bellows and thus the remaining quantity of medicament, use is made of electronic resonant circuits which comprise a coil in the base of the diaphragm bellows. To increase the sensitivity of a resonant circuit for determining the volume of the diaphragm bellows, in EP 2 177 792 A1 use is made of an additional central plate of the diaphragm bellows that has at least one opening for the medicament to pass through. To fasten the central plate, use is made of a retaining ring with retaining arms which are arranged in a cross shape, are connected to one another in a central connecting region and to which the intermediate plate is welded. The retaining ring is located, in the region of its outer edge, between the outer edges of two diaphragms and is welded thereto. A guide that prevents lateral buckling of the diaphragm bellows is not necessary in such a device just because of the shortness of the diaphragm bellows.

U.S. Pat. No. 2,657,075 A discloses a double-walled diaphragm bellows having pairs of outer diaphragms and pairs of inner diaphragms, as a result of which closed air spaces are formed between the outer diaphragms and inner diaphragms.

EP 2 982 888 A1 discloses a diaphragm bellows of the type mentioned in the introduction. For the purpose of guidance on a rod, the diaphragm bellows has guide parts which are composed of sheet metal and each of which has a retaining fin and a guide sleeve which is connected to the retaining fin. The retaining fin and the guide sleeve have small wall thicknesses and are welded to one another according to one possible embodiment. In another disclosed embodiment, the guide parts are formed in one piece, specifically L-shaped in cross section. A diaphragm bellows with guide parts for guidance on the inner surface of a tube which surrounds the diaphragm bellows is analogously formed.

SUMMARY

It is an object of the invention to provide an advantageous diaphragm bellows of the type mentioned in the introduction, the at least one guide part of which has a stable configuration, allows good guidance with respect to a rod which passes through the diaphragm bellows or a tube which surrounds the diaphragm bellows, and can be produced easily. This is achieved according to the invention by a diaphragm bellows having one or more of the features described herein.

According to the invention, the guide sleeve of the at least one guide part has a wall thickness which amounts to more than three times the wall thickness of the retaining fin of the guide part. According to a first variant of the invention, in which the at least one guide part serves to guide the diaphragm bellows on a rod which passes through the diaphragm bellows, the guide sleeve has a step, which is formed by a gradation of the external diameter of said guide sleeve and has a contact surface in particular at right angles to the longitudinal central axis. The retaining fin bears against the contact surface in a region which adjoins the inner edge of said retaining fin and is secured in a form-fitting manner against being lifted off from the contact surface. According to a second variant of the invention, in which the at least one guide part serves to guide the diaphragm bellows on the inner surface of a tube which surrounds the diaphragm bellows, the guide sleeve of the at least one guide part has a step, which is formed by a gradation of the internal diameter of said guide sleeve and has a contact surface in particular at right angles to the longitudinal central axis. The retaining fin of the guide part bears against the contact surface in a region which adjoins the outer edge of said retaining fin and is secured in a form-fitting manner against being lifted off from the contact surface.

In the case of the configuration according to the invention, the at least one guide part has a stable configuration in the region of the guide sleeve, wherein the fastening between the guide sleeve and the retaining fin is advantageously made possible without welding. In this respect, a precise guidance on the rod which passes through the diaphragm bellows or on the inner surface of the tube which surrounds the diaphragm bellows is achieved.

According to an advantageous configuration of the form-fitting securement of the retaining fin on the contact surface of the step, it is provided that the step is located in an edge region of the guide sleeve and that end portion of the guide sleeve which has the smaller external diameter is bent over to retain the retaining fin. In the case of the variant in which the guidance is effected on a rod which passes through the diaphragm bellows, this end portion of the guide sleeve is thus bent over outwardly (in a direction which points away from the longitudinal central axis). In the variant in which the guidance is effected on the inner surface of a tube which surrounds the diaphragm bellows, this end portion of the guide sleeve is thus bent over inwardly (in the direction toward the longitudinal central axis).

In another advantageous embodiment, in order to retain the retaining fin on the contact surface of the step in a form-fitting manner, it is provided that a fastening sleeve is pushed on that portion of the guide sleeve which has the smaller wall thickness and is secured to this portion of the guide sleeve. The retaining fin is therefore arranged between the step and the fastening sleeve. In the variant in which the guidance is effected on a rod which passes through the diaphragm bellows, the fastening sleeve is thus pushed on the outside of the guide sleeve. In the variant in which the guidance is effected on the inner surface of a tube which surrounds the diaphragm bellows, the fastening sleeve is thus pushed in inside the guide sleeve.

The length, measured in the direction of the longitudinal central axis of the diaphragm bellows, of the guide sleeve is preferably at least 20% larger than the diameter of the guide surface of the guide sleeve. The guide surface of the guide sleeve is the inner surface of the guide sleeve in the variant in which the guidance is effected on the outer surface of a rod which passes through the diaphragm bellows. In the variant in which the guidance is effected on the inner surface of a tube which surrounds the diaphragm bellows, the guide surface is the outer surface of the guide sleeve. This configuration makes it possible to achieve stable guidance, with the risk of canting of the guide sleeve being counteracted.

Advantageously, the retaining fin has at least one opening in a radial region which is located between the region of the connection of the retaining fin to the guide sleeve and the region of the connection of the retaining fin to the two adjacent diaphragms. In the variant in which the guidance is effected on a rod which passes through the diaphragm bellows, this at least one opening is thus located radially outside the guide sleeve. In the variant in which the guidance is effected on the inner surface of a tube which surrounds the diaphragm bellows, this opening is thus located radially inside the guide sleeve. This at least one opening makes it possible to achieve effective ventilation between those portions of the diaphragm bellows which are separated by the guide part.

BRIEF DESCRIPTION OF THE DRAWINGS

Further advantages and details of the invention are explained below on the basis of the appended drawing, in which:

FIGS. 14, 15, 16 and 17 show illustrations corresponding to FIGS. 8-11 of a further exemplary embodiment of a guide part of the diaphragm bellows;

FIG. 18 shows a section along the line HH from FIG. 17;

FIG. 19 shows an enlarged detail I from FIG. 18;

DETAILED DECRIPTION

Figure 1:
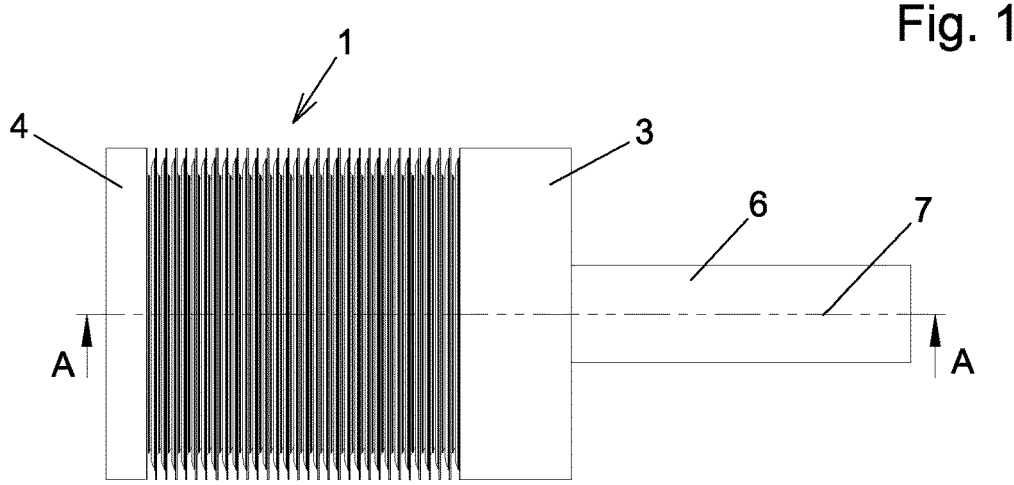
FIG. 1 shows a side view of a diaphragm bellows according to a first embodiment variant of the invention with connecting pieces attached thereto and a rod which passes through the diaphragm bellows, in the compressed end state of the diaphragm bellows.

A first embodiment variant for a diaphragm bellows according to the invention is explained below on the basis of FIGS. 1 to 13. FIGS. 1 to 7 illustrate the diaphragm bellows 1 having connecting pieces 3, 4, which are attached to diaphragms 2 at the ends and are illustrated only schematically, and having a rod 6 which passes through an inner through-opening in the diaphragm bellows.

The diaphragm bellows 1 comprises a plurality of diaphragms 2, which may also be referred to as diaphragm disks or annular diaphragms. Each diaphragm 2 has an outer edge 2a and an inner edge 2b. The outer and inner edges 2a, 2b have circular shapes.

Expediently, the diaphragms 2 are formed so as to be corrugated, without external forces acting thereon, and slightly conical, as is known. The outer edges 2a of all the diaphragms have the same diameter in this respect, in a similar way to the inner edges 2b. In particular, the diaphragms 2 have a rotationally symmetrical form. The diaphragms 2 consist of sheet metal, for example sheet steel, with a thickness preferably in the range of from 0.07 mm to 0.3 mm.

Diaphragms 1 that follow one another in the direction of the longitudinal central axis 7 of the diaphragm bellows are welded to one another alternately at their outer edges 2b and inner edges 2a, as a result of which an accordion-like configuration is produced.

In addition, the diaphragm bellows has guide parts 8, in the exemplary embodiment two guide parts 8. More or less guide parts 8 may also be provided depending inter alia on the length of the diaphragm bellows 1.

Each guide part 8 has a retaining fin 9 and a guide sleeve 10. The retaining fin 9 is located, in the region of its outer edge 9a, between the regions of the outer edges 2a of adjacent diaphragms 2 of the diaphragm bellows, i.e. diaphragms of the diaphragm bellows which follow one another in the direction of the longitudinal central axis 7. The outer edges 2a, 9a, which bear against one another, of these adjacent diaphragms 2 and of the retaining fin 9 are welded to one another. The weld may have an analogous configuration to the welds of the rest of the adjacent diaphragms 1 of the diaphragm bellows that are welded to one another at their outer edges 2a.

Proceeding from the outer edge 9a of the retaining fin 9, in the direction toward the guide sleeve 10 the retaining fin 9 comes ever closer to the longitudinal central axis 7 of the diaphragm bellows and in this respect projects beyond the inner edges 2b of the diaphragms 2 of the diaphragm bellows in the direction toward the longitudinal central axis 7. The inner edge 9b of the retaining fin 9 is thus located closer to the longitudinal central axis 7 of the diaphragm bellows than the inner edges 2b of the diaphragms 2.

A central opening 9c of the retaining fin 9 is located within the inner edge 9b of the retaining fin 9.

The retaining fin 9 has a wall thickness (sheet-metal thickness) which amounts to less than five times, preferably three times, the wall thickness of the diaphragms between which the retaining fin 9 is arranged. The wall thickness of the retaining fin 9 may correspond to the wall thickness of the diaphragms 2.

The guide sleeve 10, which passes through the central opening 9c in the retaining fin 9, is connected to the retaining fin 9 in the region of the inner edge 9b thereof.

The guide sleeve has a wall thickness which amounts to more than three times, preferably more than five times, the wall thickness of the retaining fin 9.

In order to connect the guide sleeve 10 to the retaining fin 9, the guide sleeve 10 on its outer side has a step, which is formed by a gradation of the external diameter of the guide sleeve 10. The guide sleeve 10 thus has a larger wall thickness on the one side of the step and a smaller wall thickness on the other side of the step. This step forms a contact surface 11 which is at right angles to the longitudinal central axis 7, i.e. the surface normal of this contact surface 11 is parallel to the longitudinal central axis 7.

The step is located in an edge region of the guide sleeve. Here, the guide sleeve 10 has a larger external diameter and thus a larger wall thickness over at least 90%, preferably at least 95%, of its longitudinal extent, and a smaller external diameter and thus a smaller wall thickness over the rest of its longitudinal extent. The retaining fin 9 is pushed on the portion of the guide sleeve 10 with the smaller wall thickness until it comes to bear against the contact surface 11. The end portion which has the smaller wall thickness is furthermore bent over outwardly (in a direction aligned away from the longitudinal central axis 7), as can be seen in particular from FIG. 13. As a result, the retaining fin 9 is pressed against the contact surface 11 in the region of the inner edge 9*b* of said retaining fin and secured in a form-fitting manner against being lifted off from the contact surface 11.

The inner surface of the guide sleeve 10 forms a guide surface 12 for guiding the diaphragm bellows 1 on the outer surface of the rod 6.

In the exemplary embodiment, the rod 6 is connected to the connecting piece 4. For example, the connecting piece 3 may be connected to a vacuum chamber via a flange, which is not illustrated in the Figures, and a part in the vacuum region of the vacuum chamber that is connected to the connecting piece 4 may be moved via the rod 6 and the connecting piece 4. The connecting piece 3 has ventilation bores 3*a*.

In order to effectively ventilate those regions of the diaphragm bellows 1 which are separated from one another by the guide parts 8, openings 9*d* are provided in the retaining fin 9 in the region radially outside the guide sleeve 10. These openings may, as illustrated, be formed by indentations of the inner edge 9*b* or by widened portions of the central opening 9*c*. Other ways of forming openings through the retaining fin 9 in the region between the guide sleeve 10 and the outer edge of the retaining fin 9 are conceivable and possible.

The diaphragm bellows could for example also serve to connect two vacuum chambers, and the rod 6 could be passed through an opening in the connecting piece 4, which is connected to the second vacuum chamber via a flange.

Figure 2:
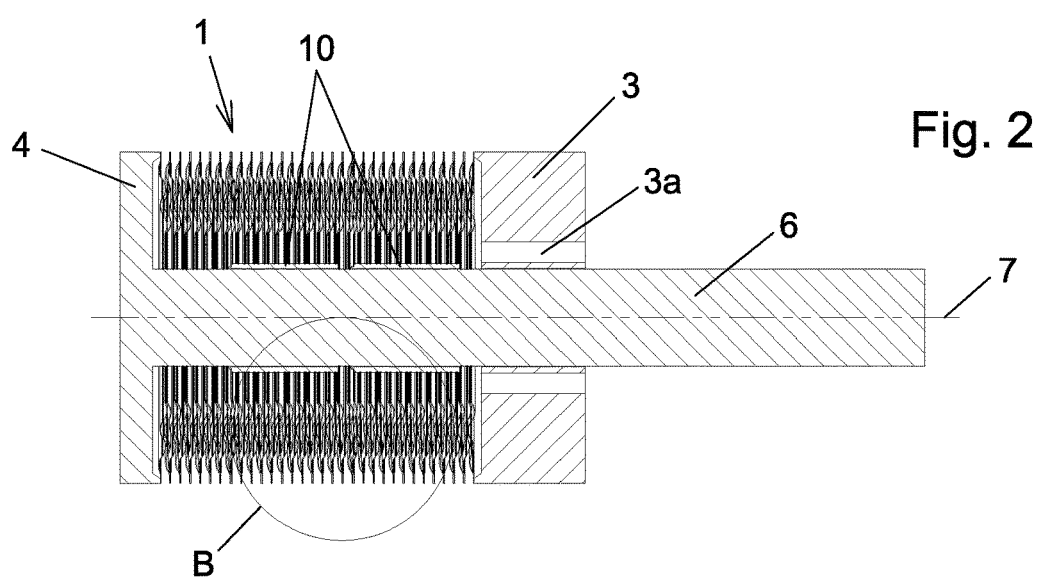
FIG. 2 shows a section along the line AA from FIG. 1.
Figure 3:
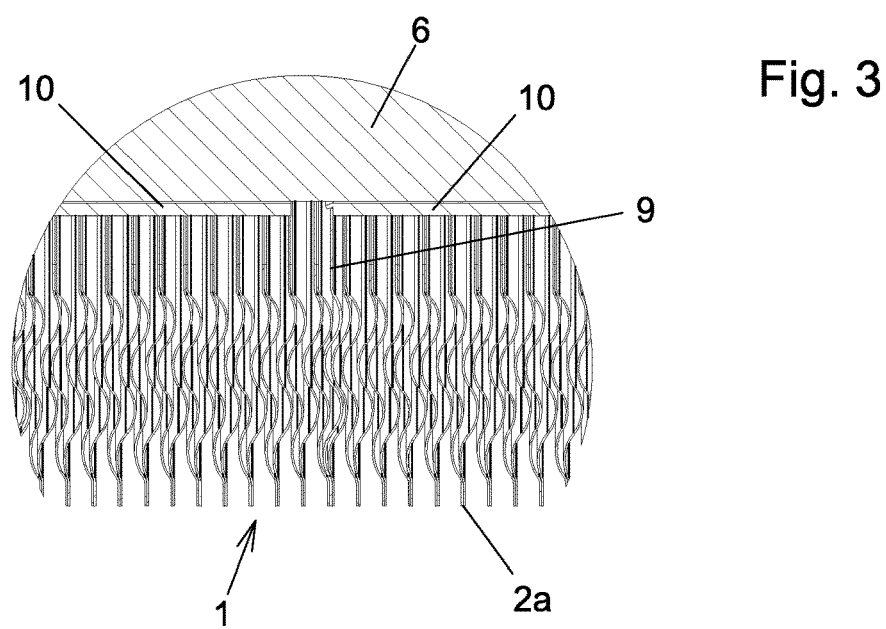
FIG. 3 shows an enlarged detail B from FIG. 2.

The diaphragm bellows has a prescribed, maximally compressed end state, which is illustrated in FIGS. 1 to 3. In order not to adversely affect the service life of the diaphragm bellows, the diaphragm bellows should not be compressed beyond this end state. In this maximally compressed end state, guide parts 8 of the diaphragm bellows that follow one another are still spaced apart from one another in the axial direction of the longitudinal central axis 7 of the diaphragm bellows, cf. FIG. 2.

Figure 4:
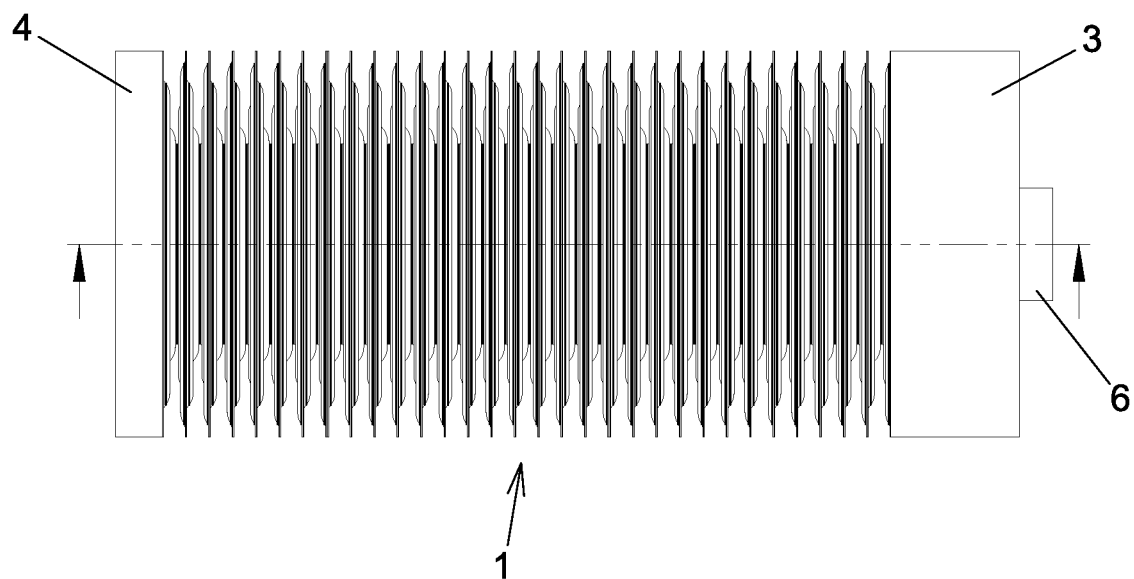
FIG. 4 shows a side view corresponding to FIG. 1, in the expanded end state of the diaphragm bellows.
Figure 5:
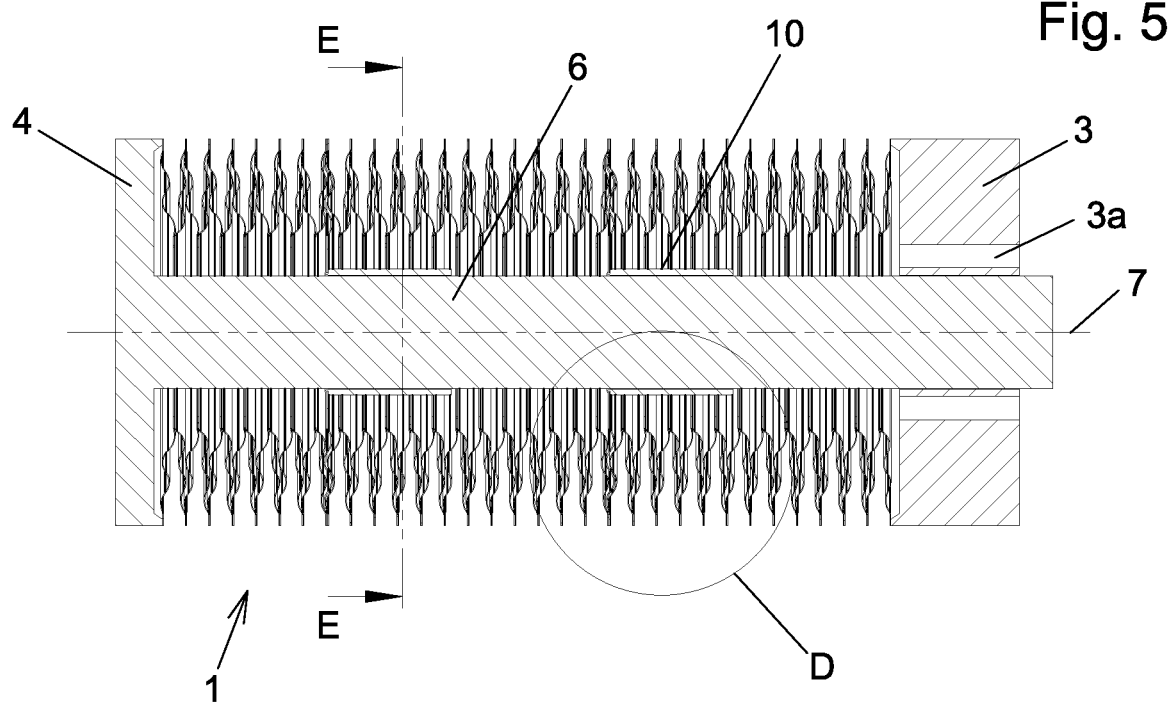
FIG. 5 shows a section along the line CC from FIG. 4.
Figure 6:
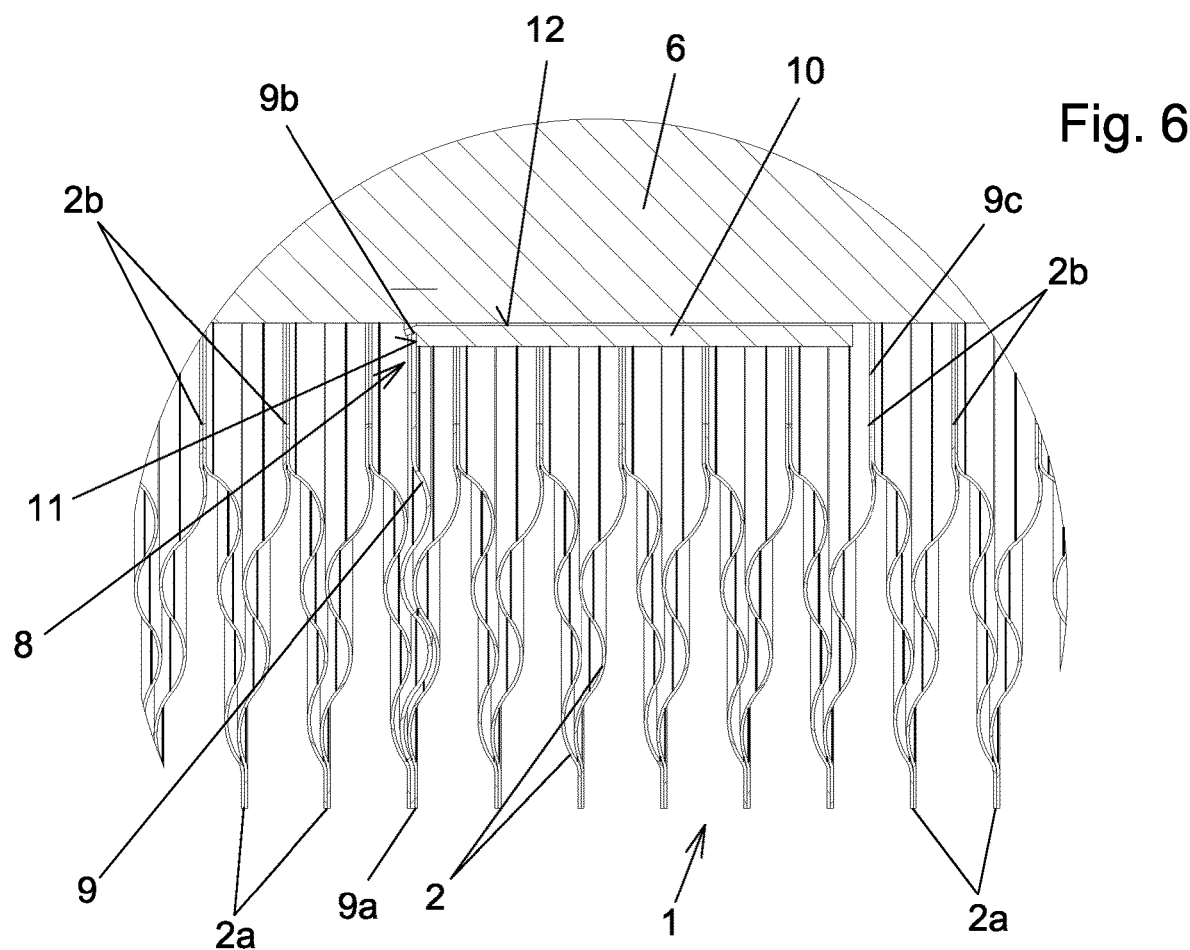
FIG. 6 shows an enlarged detail D from FIG. 5.
Figure 7:
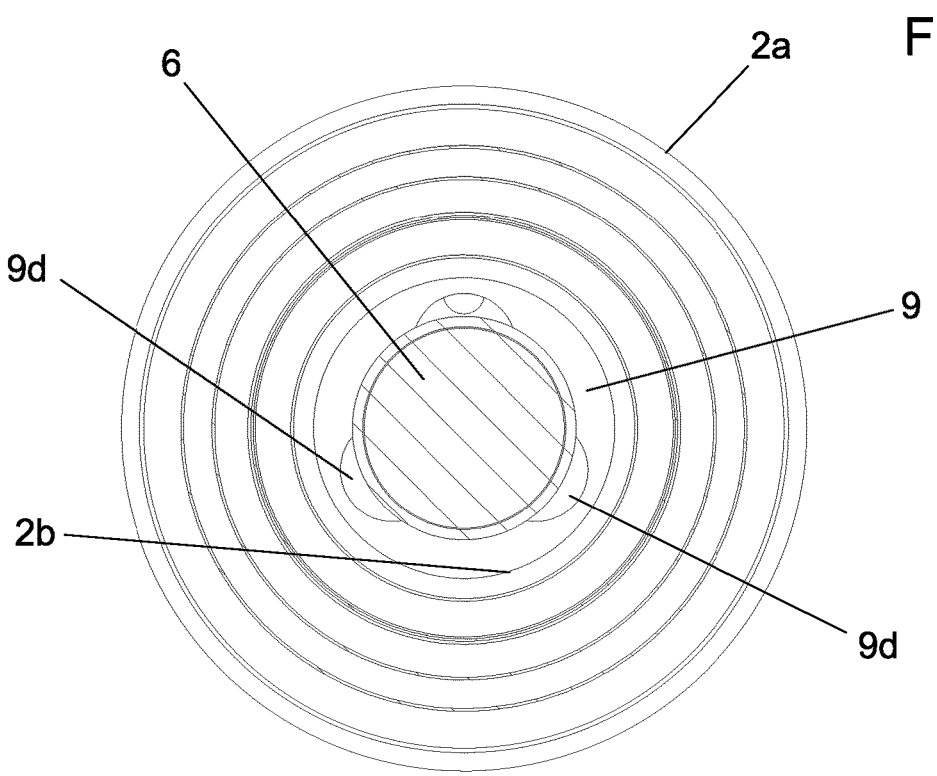
FIG. 7 shows a section along the line EE from FIG. 5.
Figure 8:
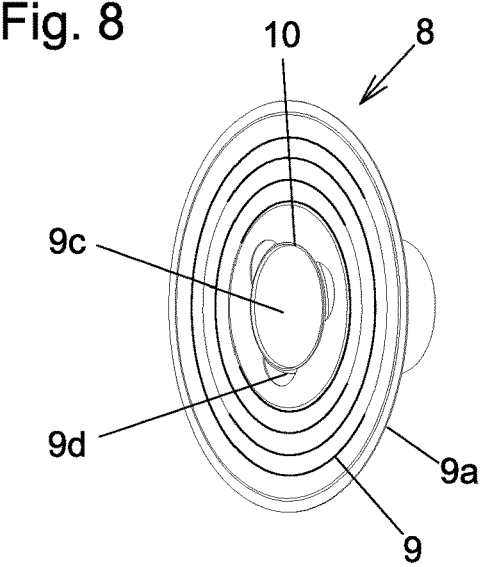
FIGS. 8 and 9 show oblique views from different viewing directions of a guide part of the diaphragm bellows.
Figure 9:
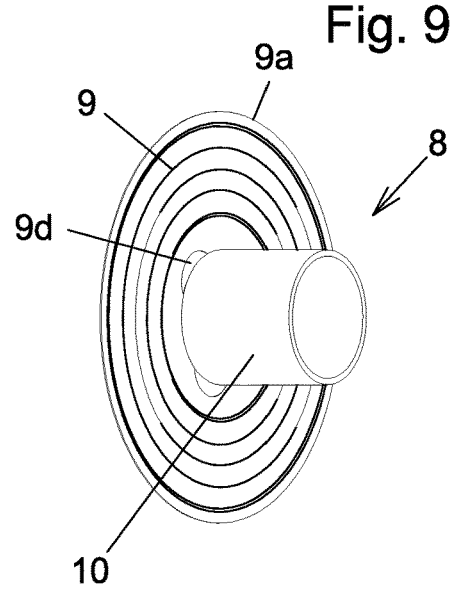
Figure 11:
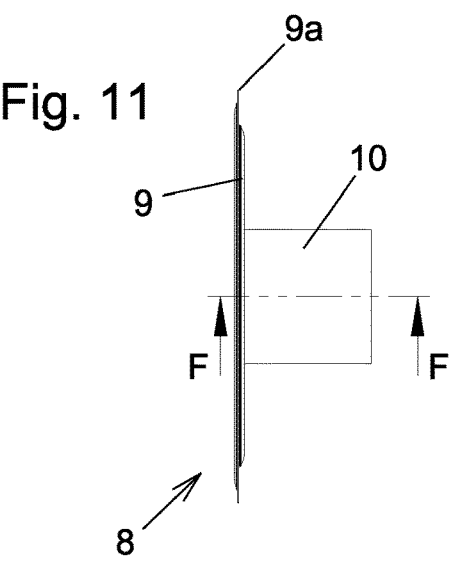
FIG. 11 shows a side view of the guide part.
Figure 10:
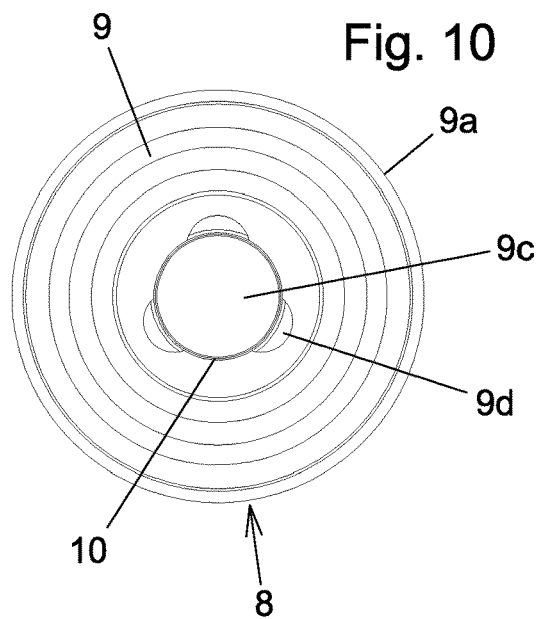
FIG. 10 shows an end-face view.
Figure 12:
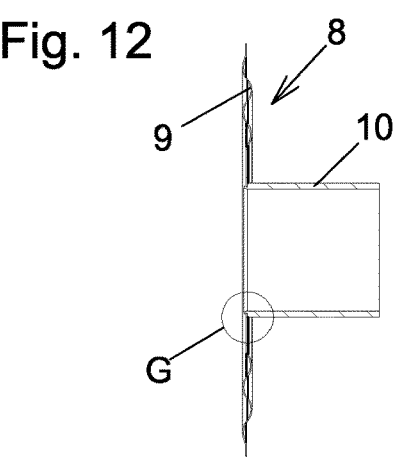
FIG. 12 shows a section along the line FF from FIG. 11.
Figure 13:
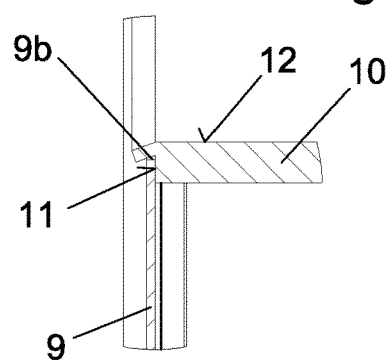
FIG. 13 shows an enlarged detail G from FIG. 12.
Figure 20:
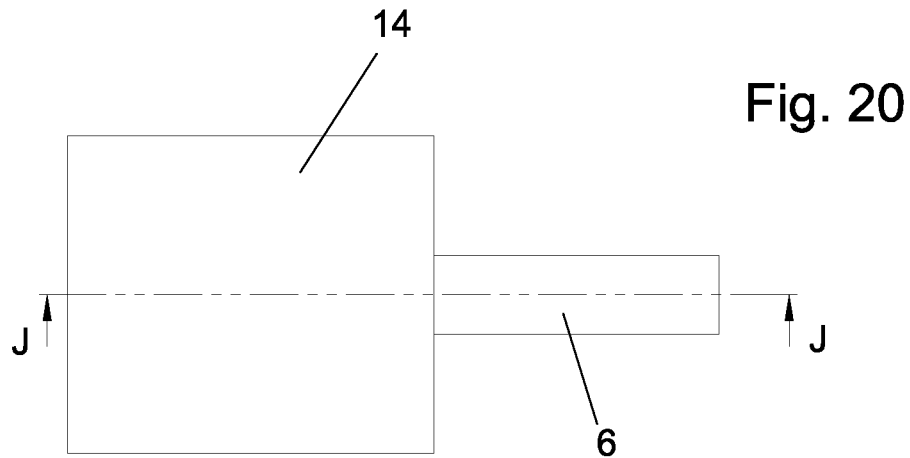
FIG. 20 shows a side view corresponding to FIG. 1 according to a second embodiment variant of the invention.
Figure 21:
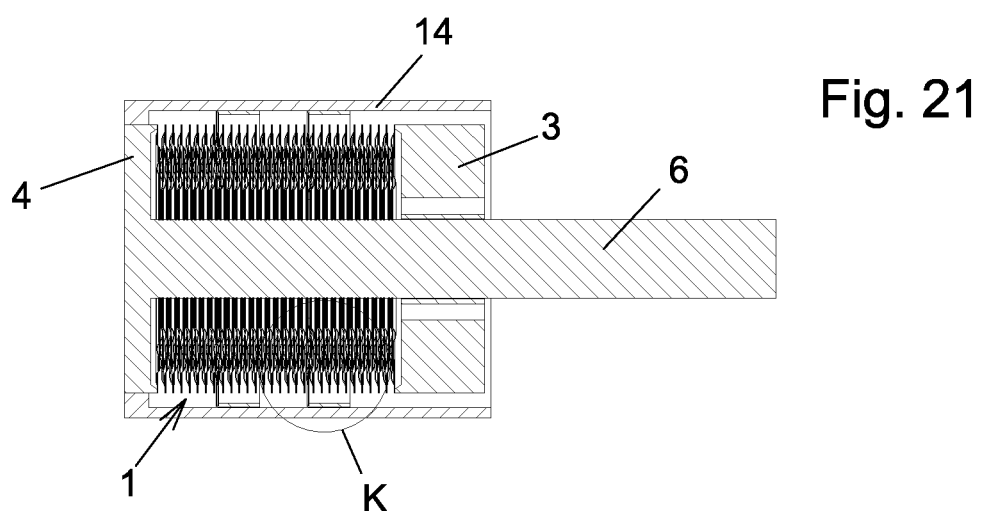
FIG. 21 shows a section along the line JJ from FIG. 20.
Figure 22:
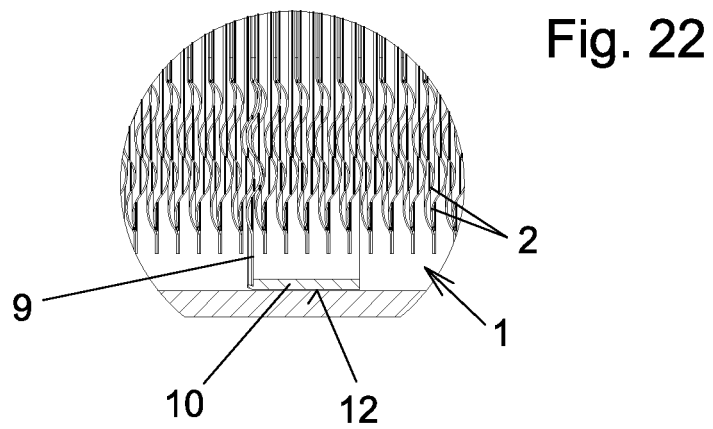
FIG. 22 shows an enlarged detail K from FIG. 21.
Figure 23:
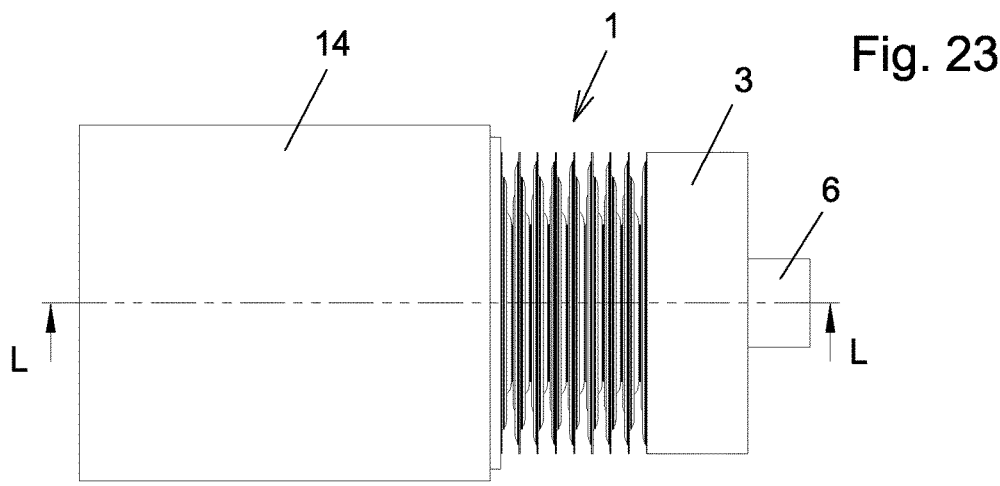
FIG. 23 shows a side view corresponding to FIG. 20 in the expanded end state of the diaphragm bellows.
Figure 24:
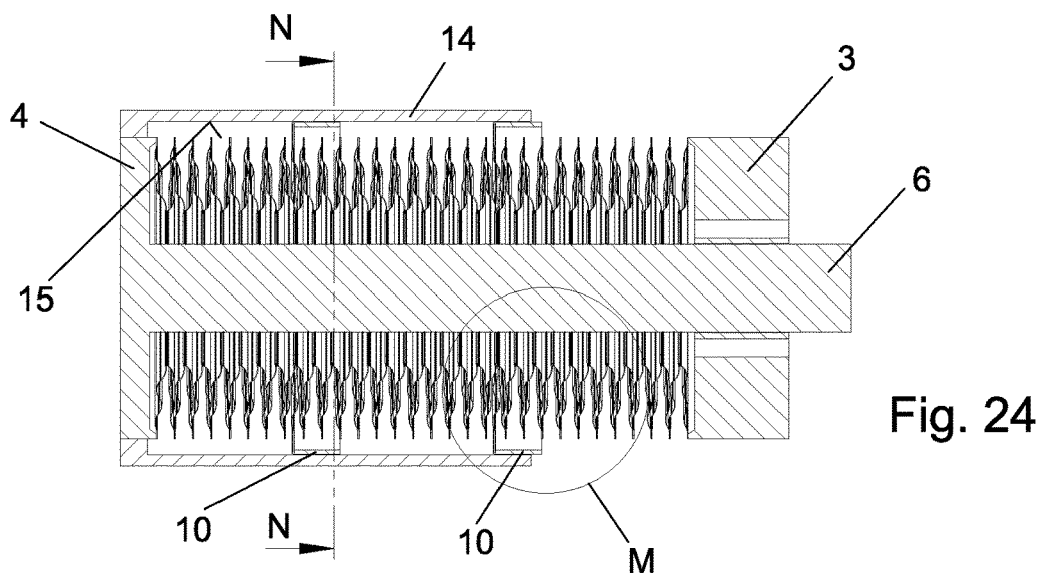
FIG. 24 shows a section along the line LL from FIG. 23.
Figure 25:
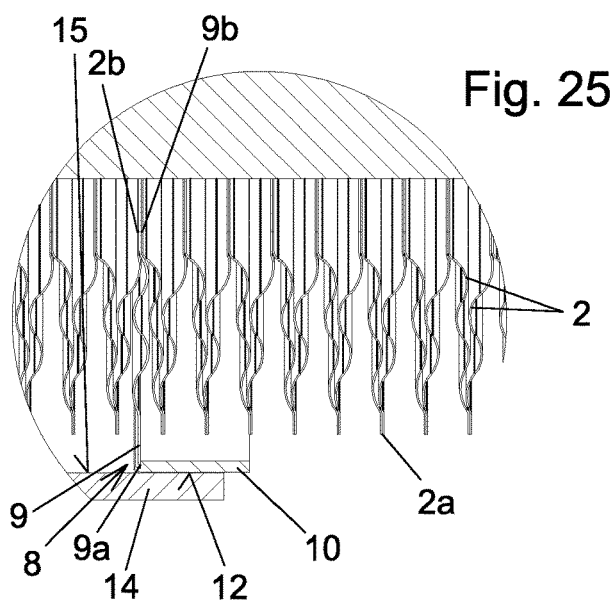
FIG. 25 shows an enlarged detail M from FIG. 24.
Figure 26:
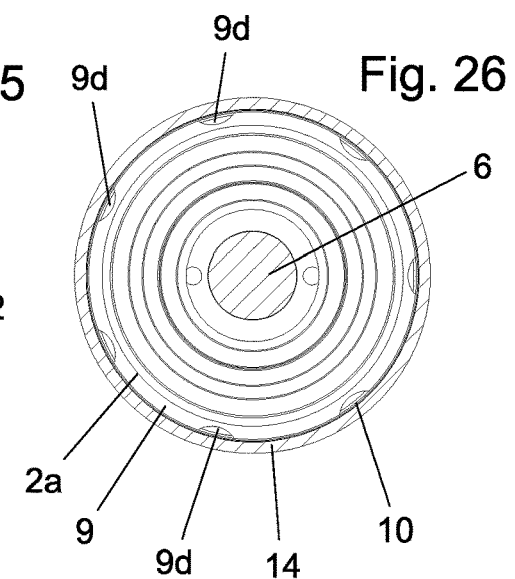
FIG. 26 shows a section along the line NN from FIG. 24.
Figure 27:
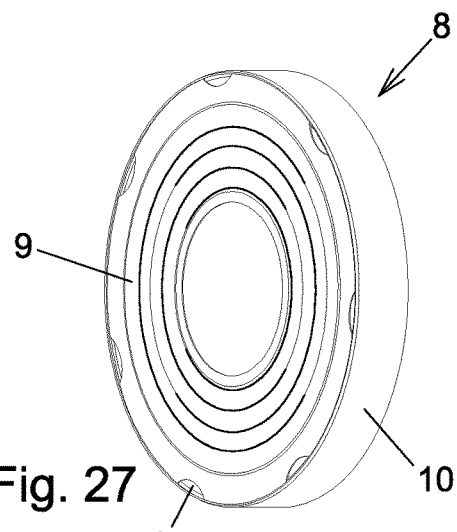
FIGS. 27 and 28 show oblique views of one of the guide parts of the diaphragm bellows according to the second embodiment variant of the invention.
Figure 28:
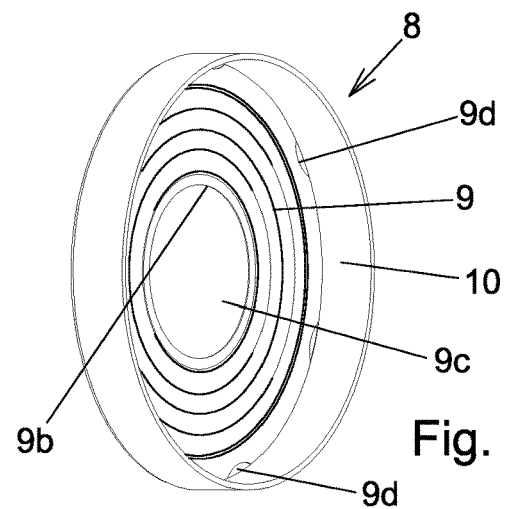
Figure 30:
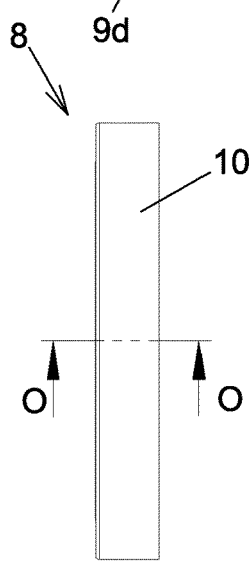
FIGS. 29 and 30 show an end-face view and a side view of the guide part.
Figure 29:
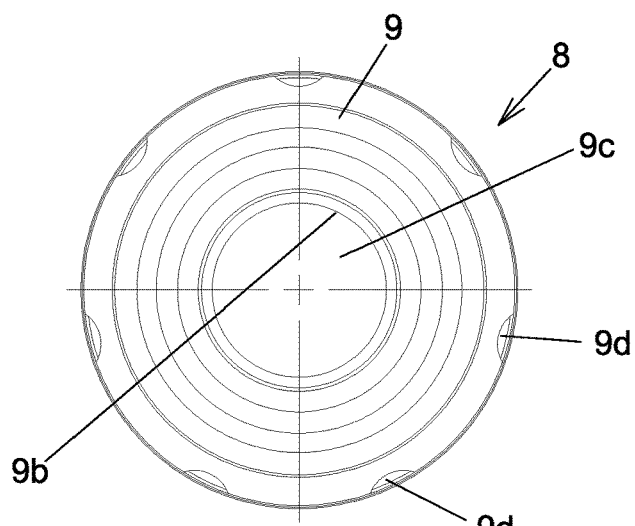
Figure 31:
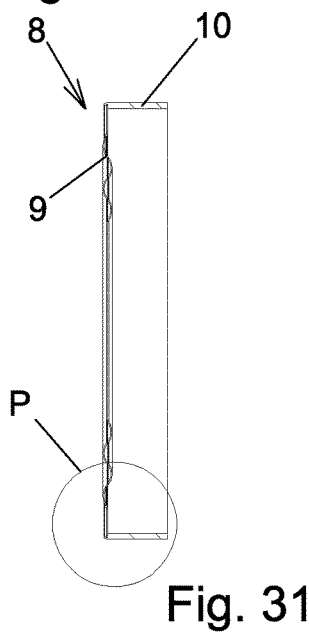
FIG. 31 shows a section along the line OO from FIG. 30.
Figure 32:
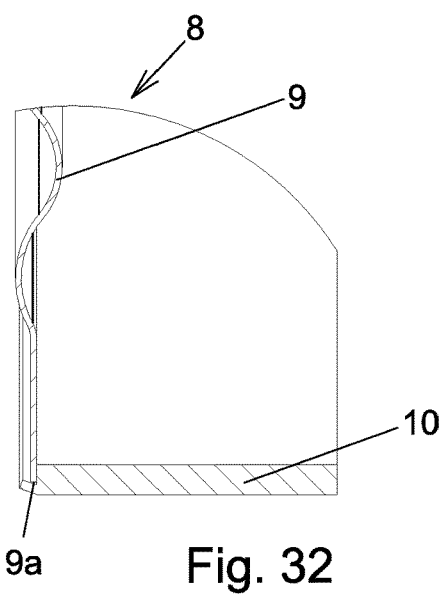
FIG. 32 shows an enlarged detail P from FIG. 31.

The maximally expanded end state, beyond which the diaphragm bellows should not be expanded, so as not to adversely affect the service life, is illustrated in FIGS. 4 to 6.

A modified configuration of a guide part according to the invention is illustrated in FIGS. 14 to 19. Apart from the differences described below, this configuration of the diaphragm bellows corresponds to that of the exemplary embodiment explained on the basis of FIGS. 1 to 13 and the description of said exemplary embodiment can be used correspondingly in this respect.

The difference with respect to the first exemplary embodiment consists in the configuration of the guide sleeve 10 of the at least one guide part 8 and the fastening of the retaining fin 9 on the guide sleeve 10. The step of the guide sleeve 10 that is formed by the gradation of the external diameter is located further away from the edge of the guide sleeve here. Expediently, the length of the portion with the smaller wall thickness here amounts to at least 10%, preferably at least 20%, of the entire length of the guide sleeve. The lengths of the portions with the smaller wall thickness and the larger wall thickness are preferably at least substantially the same (i.e. the difference amounts to less than 10% of the entire length of the guide sleeve).

In turn, the retaining fin 9 is pushed on the portion of the guide sleeve 10 with the smaller wall thickness as far as the contact surface 11. The form-fitting retention of the retaining fin 9, in order to secure it against being lifted off from the contact surface 11, is effected here by a fastening sleeve 13. Said fastening sleeve is pushed on the portion of the guide sleeve 10 with the smaller wall thickness, specifically until it comes to bear against the retaining fin 9 (in the region of the inner edge 9*b*). The retaining fin 9 is thus located, in a region adjoining its inner edge 9*b*, between the contact surface 11 of the guide sleeve 10 and the end-face surface of the fastening sleeve 13.

The fastening sleeve 13 is retained on the guide sleeve 10 in a clamping manner and/or is materially bonded thereto, in particular by way of an adhesive bond.

The length of the fastening sleeve 13 preferably amounts to more than twice, preferably more than three times, the wall thickness of the fastening sleeve 13. The fastening sleeve 13 could also be referred to as a fastening ring.

A second embodiment variant of the invention is illustrated in FIGS. 20 to 32. Apart from the differences described below, this configuration corresponds to the first embodiment variant described on the basis of FIGS. 1 to 13 and the description of the first embodiment variant can be used correspondingly in this respect.

In this embodiment variant of the invention, the guidance of the diaphragm bellows is effected on the inner surface 15 of a tube 14 which surrounds the diaphragm bellows. The retaining fin 9 is located here, in the region of its inner edge 9*b*, between the regions of the inner edges 2*b* of the adjacent diaphragms 2. The inner edges 2*b*, 9*b*, which bear against one another, of these adjacent diaphragms 2 of the diaphragm bellows and of the retaining fin 9 are welded to one another.

Proceeding from the inner edge 9*b* of the retaining fin 9, in the direction toward the guide sleeve 10 the retaining fin 9 is increasingly further away from the longitudinal central axis 7 of the diaphragm bellows and in this respect projects beyond the outer edges 2*a* of the diaphragms 2 of the diaphragm bellows 1 in a direction which points away from the longitudinal central axis 7. The guide sleeve 10 surrounds the longitudinal central axis 7 and is further away from the longitudinal central axis 7 than the outer edges 2*a* of the diaphragms 2 of the diaphragm bellows 1. The outer edge 9*a* of the retaining fin 9 is connected to the guide sleeve 10. To this end, the guide sleeve 10 has a step which is formed by a gradation of the internal diameter of said guide sleeve and forms a contact surface 11 at right angles to the longitudinal central axis 7. The retaining fin 9 bears against this contact surface 11 in a region adjoining the outer edge 9*a* of said retaining fin. The step is located in an edge region of the guide sleeve 10, analogously to the first embodiment variant corresponding to FIGS. 1 to 13, and, in order to retain the guide sleeve in a form-fitting manner, that end portion of the guide sleeve which has the smaller wall thickness is bent over, in this embodiment variant inwardly (in the direction toward the longitudinal central axis 7).

Here, the outer surface of the guide sleeve 10 forms the guide surface 12 for guidance on the inner surface 15 of the tube 14.

In this embodiment variant, the retaining fin 9 has openings 9*d* for ventilation purposes radially inside the guide sleeve 10. In order to form the openings 9*d*, the outer edge 9a of the retaining fin 9 may be provided with indentations which form the openings 9d. Other ways of forming openings through the retaining fin 9 in the region between the guide sleeve 10 and the inner edge of the retaining fin 9 are conceivable and possible.

Figure 33:
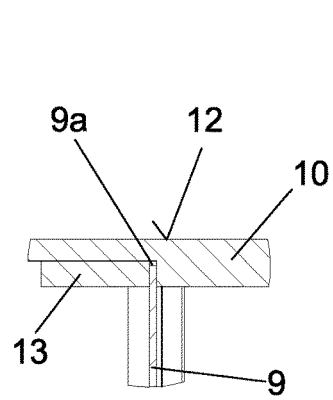
FIG. 33 shows a detail of a section (sectional line analogous to the sectional line OO in FIG. 30) through a further exemplary embodiment of a guide part.

In this second embodiment variant of the invention, it is also possible that in a modification of the at least one guide part the retaining fins 9 are retained bearing against the surface 11 by a fastening sleeve 13, analogously to the exemplary embodiment illustrated in FIGS. 14 to 19; cf. FIG. 33. The step of the guide sleeve 12 that is formed by the gradation of the internal diameter is located further away from the edge of the guide sleeve 12 here and the inside of the fastening sleeve 13 is pushed on that portion of the guide sleeve which has the smaller wall thickness and is secured to this portion. The retaining fin 9 is thus in turn arranged between the contact surface 11 and the fastening sleeve 13; cf. FIG. 33.

LEGEND FOR THE REFERENCE SIGNS

1 Diaphragm bellows
2 Diaphragm
2a Outer edge
2b Inner edge
3 Connecting piece
3a Ventilation bore
4 Connecting piece
6 Rod
7 Longitudinal central axis
8 Guide part
9 Retaining fin
9a Outer edge
9b Inner edge
9c Central opening
9d Opening
10 Guide sleeve
11 Contact surface
12 Guide surface
13 Fastening sleeve
14 Tube
15 Surface

The invention claimed is:

1. A diaphragm bellows, comprising:
a plurality of diaphragms with outer edges and inner edges, the diaphragms that follow one another in a direction of a longitudinal central axis of the diaphragm bellows are welded to one another alternately in a region of the inner edges thereof and in a region of the outer edges thereof;
at least one guide part for guidance on an outer surface of a rod which passes through an inner through-opening in the diaphragm bellows, the at least one guide part has a retaining fin, which is located, in a region of an outer edge thereof, between adjacent ones of the diaphragms, that is welded to said adjacent diaphragms and an inner edge of which that surrounds a central opening in the retaining fin is located closer to the longitudinal central axis than the inner edges of said adjacent diaphragms, and has a guide sleeve, surrounding the longitudinal central axis, with a guide surface for guidance of the diaphragm bellows on the outer surface of the rod, wherein the guide sleeve passes through the central opening in the retaining fin and is connected to the retaining fin;
the guide sleeve has a wall thickness that is more than three times a wall thickness of the retaining fin;
the guide sleeve has a step formed by a gradation of an external diameter of said guide sleeve and forms a contact surface; and
the retaining fin bears against the contact surface in a region which adjoins the inner edge of said retaining fin and is secured by a form-fit against being lifted off from the contact surface.

2. The diaphragm bellows as claimed in claim 1, wherein the step is located in an edge region of the guide sleeve and an end portion of the guide sleeve which has a smaller wall thickness is bent over to retain the retaining fin with the form-fit.

3. The diaphragm bellows as claimed in claim 1, wherein, in order to retain the retaining fin with the form-fit, a fastening sleeve is pushed on a portion of the guide sleeve which has a smaller wall thickness and is secured to said portion of the guide sleeve, and the retaining fin is arranged between the contact surface of the step and the fastening sleeve.

4. The diaphragm bellows as claimed in claim 1, wherein a length of the guide sleeve is at least 20% larger than a diameter of the guide surface of the guide sleeve.

5. The diaphragm bellows as claimed in claim 1, wherein the retaining fin has at least one opening in a radial region, which is located between a region of a connection of the retaining fin to the guide sleeve and a region of a connection of the retaining fin to the two adjacent diaphragms.

6. The diaphragm bellows as claimed in claim 1, wherein the wall thickness of the retaining fin is less than five times a wall thickness of the diaphragms between which the retaining fin is arranged.

7. The diaphragm bellows as claimed in claim 6, wherein the wall thickness of the retaining fin is less than three times the wall thickness of the diaphragms between which the retaining fin is arranged.

8. The diaphragm bellows as claimed in claim 1, wherein the wall thickness of the guide sleeve is more than five times the wall thickness of the retaining fin to which the guide sleeve is connected.

9. The diaphragm bellows as claimed in claim 1, wherein the contact surface of the step is at right angles to the longitudinal central axis of the diaphragm bellows.

10. A diaphragm bellows, comprising:
a plurality of diaphragms with outer edges and inner edges, the diaphragms that follow one another in a direction of a longitudinal central axis of the diaphragm bellows are welded to one another alternately in a region of the inner edges thereof and in a region of the outer edges thereof;
at least one guide part for guidance on an inner surface of a tube which surrounds the diaphragm bellows, the at least one guide part has a retaining fin, which is located, in a region of an inner edge thereof, between adjacent ones of the diaphragms, that is welded to said adjacent diaphragms and an outer edge of which is located further away from the longitudinal central axis of the diaphragm bellows than the outer edges of said adjacent diaphragms, and has a guide sleeve, surrounding the longitudinal central axis, with a guide surface for guidance of the diaphragm bellows on an inner surface of the tube, wherein the guide sleeve surrounds the outer edge of the retaining fin and is connected to the retaining fin;
the guide sleeve has a wall thickness that is more than three times a wall thickness of the retaining fin;

the guide sleeve has a step formed by a gradation of an internal diameter of said guide sleeve and forms a contact surface; and the retaining fin bears against the contact surface in a region which adjoins the outer edge of said retaining fin and is secured by a form-fit against being lifted off from the contact surface.

11. The diaphragm bellows as claimed in claim 10, wherein the step is located in an edge region of the guide sleeve and an end portion of the guide sleeve which has a smaller wall thickness is bent over to retain the retaining fin with the form-fit.

12. The diaphragm bellows as claimed in claim 10, wherein, in order to retain the retaining fin with the form-fit, a fastening sleeve is pushed on a portion of the guide sleeve which has a smaller wall thickness and is secured to said portion of the guide sleeve, and the retaining fin is arranged between the contact surface of the step and the fastening sleeve.

13. The diaphragm bellows as claimed in claim 10, wherein a length of the guide sleeve is at least 20% larger than a diameter of the guide surface of the guide sleeve.

14. The diaphragm bellows as claimed in claim 10, wherein the retaining fin has at least one opening in a radial region, which is located between a region of a connection of the retaining fin to the guide sleeve and a region of a connection of the retaining fin to the two adjacent diaphragms.

15. The diaphragm bellows as claimed in claim 10, wherein the wall thickness of the retaining fin is less than five times a wall thickness of the diaphragms between which the retaining fin is arranged.

16. The diaphragm bellows as claimed in claim 15, wherein the wall thickness of the retaining fin is less than three times the wall thickness of the diaphragms between which the retaining fin is arranged.

17. The diaphragm bellows as claimed in claim 10, wherein the wall thickness of the guide sleeve is more than five times the wall thickness of the retaining fin to which the guide sleeve is connected.

18. The diaphragm bellows as claimed in claim 10, wherein the contact surface of the step is at right angles to the longitudinal central axis of the diaphragm bellows.

\* \* \* \* \*